United States Patent [19]

Higuchi et al.

[11] Patent Number: 5,142,177
[45] Date of Patent: Aug. 25, 1992

[54] MAGNETICALLY CONTROLLED BEARING UNIT

[75] Inventors: Toshiro Higuchi, Fujigaoka Mansion 509, 2-7-5 Fujigaoka, Midori-ku, Yokohama-shi, Kanagawa-ken; Takeshi Sawamoto, Tokyo; Hiromasa Fukuyama; Takeshi Takizawa, both of Kanagawa, all of Japan

[73] Assignees: Toshiro Higuchi; Nippon Seiko Kabushiki Kaisha

[21] Appl. No.: 339,709

[22] Filed: Apr. 18, 1989

[30] Foreign Application Priority Data

Apr. 22, 1988 [JP] Japan .................................. 63-98182

[51] Int. Cl.⁵ ............................................. H02K 7/09
[52] U.S. Cl. .................................... 310/90.5; 310/51; 384/535
[58] Field of Search .............. 310/90.5, 90, 51; 384/446, 448, 531, 585

[56] References Cited

U.S. PATENT DOCUMENTS

| | | | |
|---|---|---|---|
| 3,582,162 | 6/1971 | Baermann | 310/90.5 |
| 3,845,995 | 11/1974 | Wehde | 310/90.5 |
| 3,877,761 | 4/1978 | Boden | 310/90.5 |
| 4,114,960 | 9/1978 | Habermann | 310/90.5 |
| 4,182,967 | 1/1980 | Jordan | 310/90.5 |
| 4,609,332 | 9/1986 | Miki | 310/90.5 |
| 4,626,754 | 12/1986 | Habermann | 310/90.5 |
| 4,652,780 | 3/1987 | Murakami | 310/90.5 |
| 4,683,391 | 7/1987 | Higuchi | 310/49 R |
| 4,697,128 | 9/1987 | Matsushita | 310/90.5 |
| 4,723,735 | 2/1988 | Eisenhaure | 310/90.5 |

FOREIGN PATENT DOCUMENTS

| | | | |
|---|---|---|---|
| 0288343 | 10/1988 | European Pat. Off. | 310/51 |
| 0294760 | 12/1988 | European Pat. Off. | 310/90.5 |
| 1473903 | 3/1969 | Fed. Rep. of Germany | 384/535 |
| 2229332 | 1/1973 | Fed. Rep. of Germany | 310/90.5 |

*Primary Examiner*—R. Skudy
*Attorney, Agent, or Firm*—Thomas R. Morrison

[57] ABSTRACT

A bearing unit comprising a rotating body, a rotating shaft and a bearing, wherein there is provided a construction with a plurality of electromagnetic poles is arranged, together with a plurality of sensors for detecting the run-out of the rotating shaft, and also comprises a control circuit for controlling the intensity of a magnetic force according to a detection output of these sensors, thereby controlling the bearing unit so that vibration and run-out of the rotating body due to inbalance thereof are effectively suppressed while making the unit to revolve around the principle axis of shape.

9 Claims, 17 Drawing Sheets

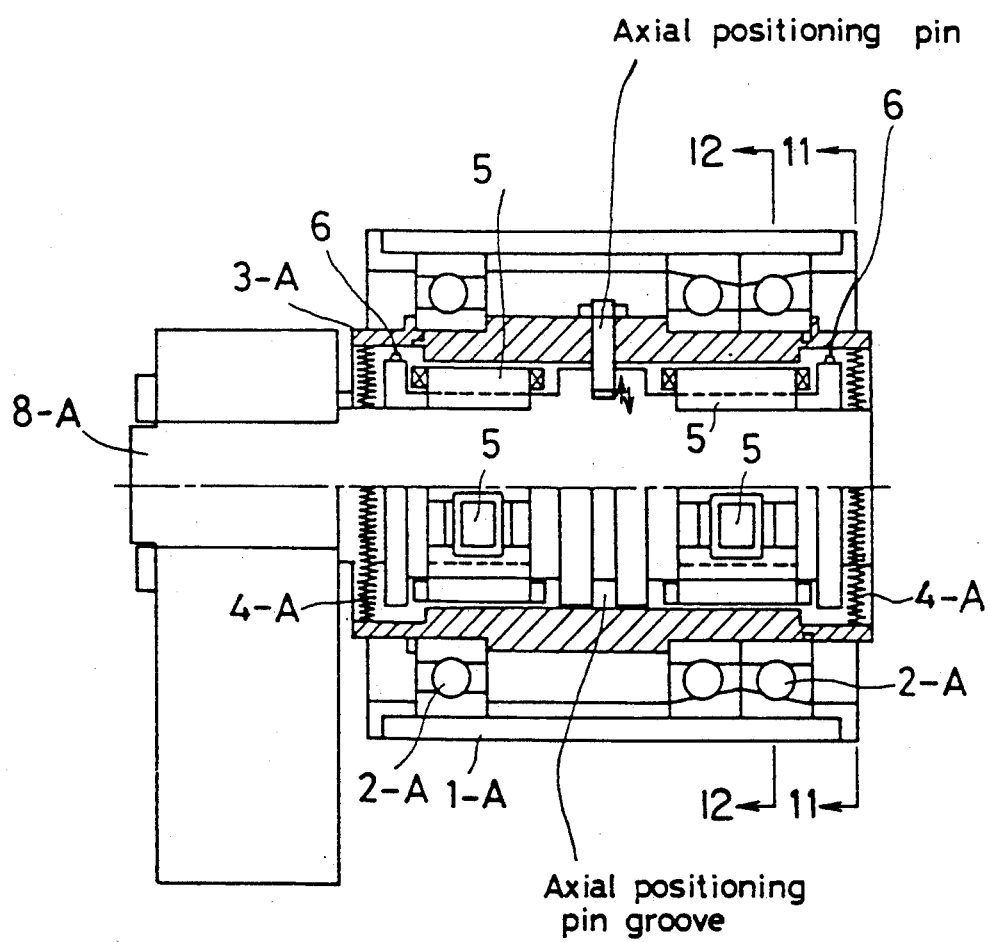

MAGNETICALLY CONTROLLED BEARING UNIT

BACKGROUND OF THE INVENTION

1. Field of the Invention

The present invention relates to a roller supporting or a general-purpose bearing unit for supporting a main shaft of a machining tool, etc.

2. Description of the Prior Art

Heretofore, a pillow block has been used as a supporting unit for a rotating shaft or a hollow roll and other rotating body in a rotatable or swingable manner. The structure of such a pillow block is shown in FIG. 25 in which a rotating body $R_1$ is supported with 2 pillow blocks P at both ends under a bearing $B_1$. In the figure, H shows a housing.

Another bearing unit, known in the prior art, is shown in the specification of U.S. Pat. No. 4,114,960 of Helmut Habermann et al. and FIG. 27 in which a magnetic bearing $B_2$ supports magnetically a rotor shaft of a motor. According to this system, the position of a rotating shaft $R_2$ is detected by a radial sensor RS and an axial sensor AS, while signals of detection controlling currents flowing in a radial electromagnetic pole RE and an axial electromagnetic pole AE, respectively, for controlling an attracting force of each electrode. Thus, the rotating shaft is supported rotatably in a non-contact state at a predetermined position.

With said pillow block P, a vibration system comprising a rotating body $R_1$—a bearing $B_1$—a housing H, is constituted. In this vibration system, a damping force in the system greatly depends on a damping force of the bearing. However, the damping force of a roller bearing is normally extremely small. Therefore if there is a large unbalance in the rotating body $R_1$, a large centrifugal force occurs during revolution due to balance. This centrifugal force largely swings the entire pillow block via the bearing $B_1$ of the pillow block P. As a result, a base on which the pillow block P is mounted is vibrated.

In addition, the rotating body $R_1$ supported by the pillow block P is borne through a principal axis of shape m-m as shown in FIG. 26. However, the position of this rotating center axis cannot be changed freely. For example, the body R cannot be supported through the principal axis center of inertia n-n.

On the other hand, said magnetic bearing $B_2$ is structured so that the rotating body $R_2$ is floated in a completely non-contact state. However, where a long and large roll must be supported at both ends, mounting errors might become so large that a current for controlling the balance of the rotating body becomes large enough to pose economic disadvantage.

Another system of bearing, known in the prior art for supporting a rotor which is rotating at a high revolutional frequency against a stationary member, in a contactless manner in a radial direction, is disclosed in the U.S. Pat. No. 3,877,761 for example.

Furthermore, another system of a bearing known in the prior art is disclosed in the U.S. Pat. No. 4,683,391 in which an actuator comprises a rotor having teeth with a predetermined pitch and a revolution control coil wound on a plurality of pole pieces formed on a core member in opposition to said rotor.

These 2 preceding examples are structured in such a manner that the rotating shaft is supported contactless by magnetic control. However, similar to the example shown in FIG. 27 and the U.S. Pat. No. 4,114,960, a current for controlling the balance of the rotating body becomes so high that it is disadvantageous economically where a large roll must be supported at both ends and the error in mounting the shaft becomes excessive.

Also in this case, if mounting errors occur between the shaft and a magnetic pole during assembly work, the shaft or the pole might be damaged because of the interference between them. The heavier or longer the shaft is, the more severe this trend of damage results. In fact, assembly work become impossible.

In addition, where the weight of a load applied to the shaft becomes larger, a larger deflection load is created. As a result, a current supplied to the magnetic poles must be increased disadvantageously.

SUMMARY OF THE INVENTION

The present invention has been accomplished to solve these circumstances. Objects of the invention include a. damping forces and spring constants in the vibration system including the rotating body are changed, b. the resonance of the rotating shaft is prevented in a predetermined range of revolution frequencies, c. the center of the bearing is varied periodically according to the revolution angle of the rotating shaft, d. vibration is not transmitted to the housing by rotating the body around the principal axis center of inertia and e. such a novel bearing unit, as the swing or deflection vibration due to imbalance of the rotating body are suppressed while turning the body around the center principal axis or the shape and positively controlling other various moving and vibrating states of the rotating shaft, is provided practically.

More explicitly, according to the principles of the present invention, the following devices and circuit features are provided for positively and magnetically controlling a bearing unit in order to achieve the objects described above.

A rotating shaft, a bearing for supporting said rotating shaft, a bearing holding body for holding said bearing, an outer housing which holds said bearing holding body by supporting with an elastic body, a plurality of electromagnetic poles which are arranged in opposition on an outer wall of said bearing holding body with intervals therebetween and are fixed on said outer housing, a plurality of sensors which are mounted on said outer housing or said bearing holding body and detect movement of the bearing holding body, and a control circuit which controls the intensity of an attracting force of said electromagnetic poles according to a detection output of said sensors.

A roller, a bearing for supporting said roller, a bearing holding body engaged in an inner ring of said bearing and holding the bearing, an inner housing which holds said bearing holding body by supporting with an elastic body, a plurality of electromagnetic poles which are arranged in opposition on an inside wall of said bearing holding body with intervals therebetween and are fixed on said inner housing, a plurality of sensors which are mounted on said inner housing or said bearing holding body and detect the movement of the bearing holding body, and a control circuit which controls the intensity of an attracting force of said electromagnetic poles according to a detecting output of said sensors.

According to Claim 1 or 2, the control circuit has a variable circuit constant and is capable of giving variable damping force and spring constant to the bearing holding body.

The control circuit is provided with a means for changing a circuit constant according to a predetermined range of the revolution frequency for the rotating shaft or the roller and also is provided with a means for changing a target position reference voltage of each electromagnetic pole according to a rotating angle of the rotating shaft or the roller.

Further, the control circuit is provided with a center frequency variable band cutoff filter which cuts off a feedback of a frequency component corresponding to a revolution frequency of the rotating shaft or the roller, being further provided with a first means for calculating a deviation from a principal axis of inertia on the basis of information on the rotating angle of the rotating shaft or the roller and displacement information from the sensor, and a second means for varying the target position reference voltage periodically according to a revolution angle of the rotating body so that the rotating body can rotate around the principal axis of inertia.

A third means is included in the control circuit for further modifying the target position reference voltage of each electromagnetic pole by detecting a current supplied to each electromagnetic pole, thereby minimizing a current for correcting a rotation deflection of the bearing holding body, and a fourth means for detecting a deflection acceleration of the outer housing or the inner housing and a fifth means for further modifying the target position reference voltage of each electromagnetic pole for minimizing said acceleration also are included in the control circuit.

According to the compositions (1) and (2) above, the status of motion and vibration for the rotating shaft is positively controlled. The damping force and spring constant can be made variable, while avoiding the resonance of the rotating shaft in a predetermined range of revolution frequencies is prevented. Further, the target position reference voltages changing means allows periodically varying the center of the bearing according to the evolution angle of the rotating shaft, and the center frequency variable band cutoff filter makes the shaft rotate around the axis of inertia while maintaining a predetermined damping force and spring constant. By the control circuit deviation calculating and target position reference voltage means, around the principal axis of inertia, the compositions while other means provide the precise revolution around the principal axis of inertia.

BRIEF DESCRIPTION OF THE DRAWINGS

FIG. 10 is a side section view of the major portions in a second embodiment.

DESCRIPTION OF THE PREFERRED EMBODIMENTS

The present invention is now described in detail referring to certain embodiments thereof.

Figure 1:
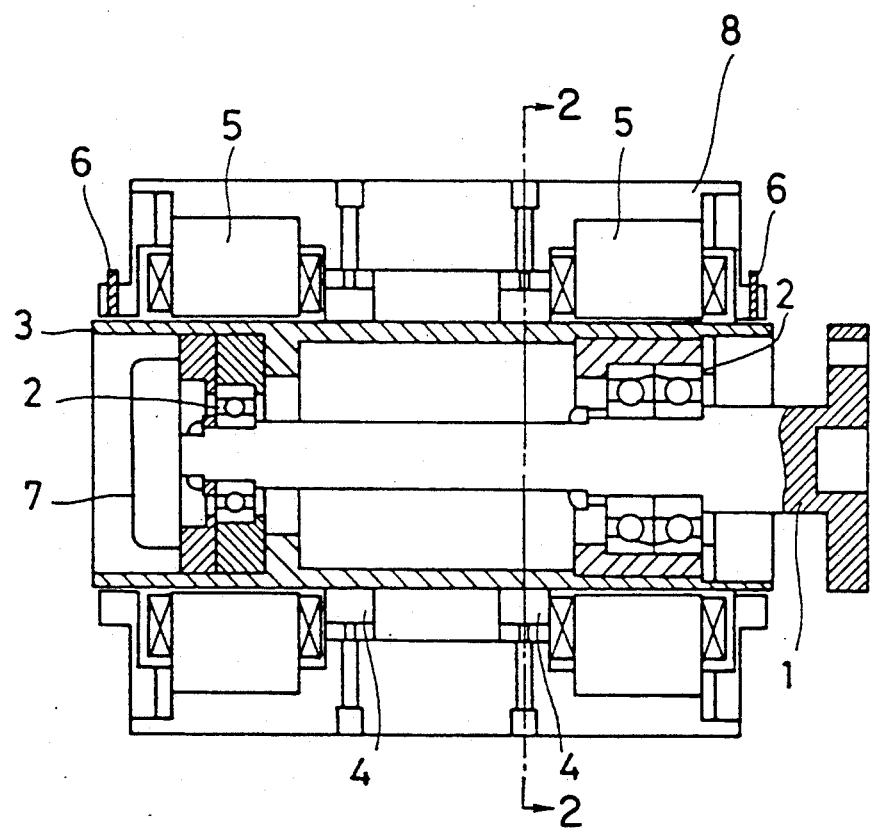
FIG. 1 shows a side section view of major portions of a first embodiment of the present invention.
Figure 2:
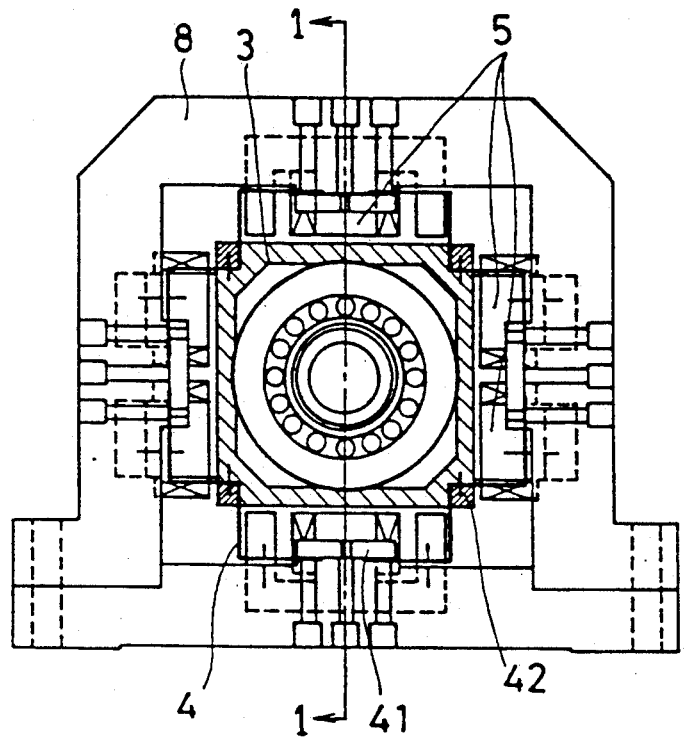
FIG. 2 shows a cross section view of the same portions.

FIGS. 1 and 2 show major portions of a first embodiment "magnetically controlled bearing unit" according to the present invention; FIG. 1 shows a side section view seen from line 1—1 of FIG. 2, while FIG. 2 relating to a cross section view from line 2—2 of FIG. 1. FIGS. 3 through 9 provide description views for members used in the same embodiment.

Figure 3:
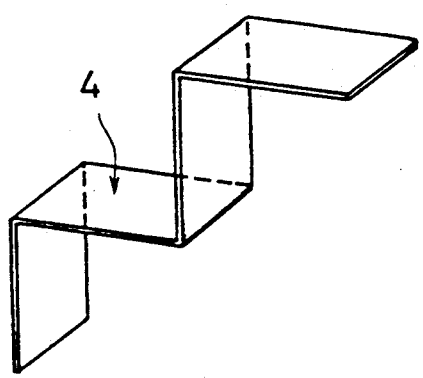
FIG. 3 is an oblique view of a leaf spring used in the same embodiment.
Figure 4:
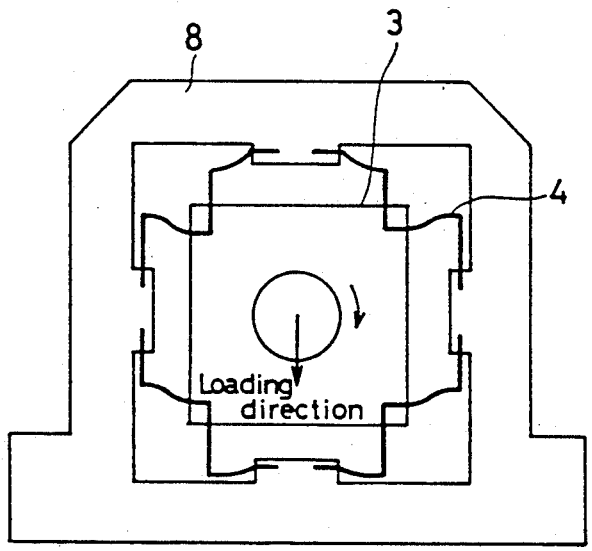
FIGS. 4 and 5 shows relationships between the shape and loading direction of the leaf spring.
Figure 6:
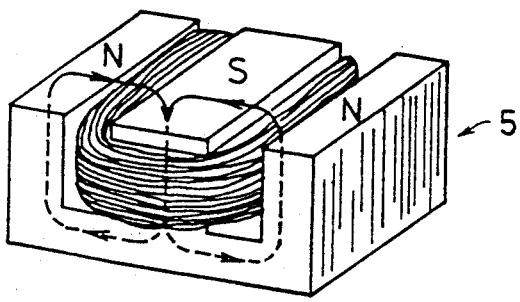
FIG. 6 is an oblique view of the electromagnetic pole used in the first embodiment.
Figure 5:
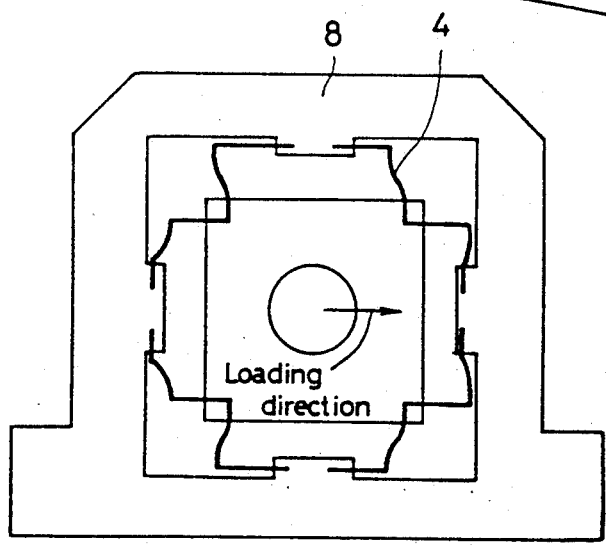
Figure 7:
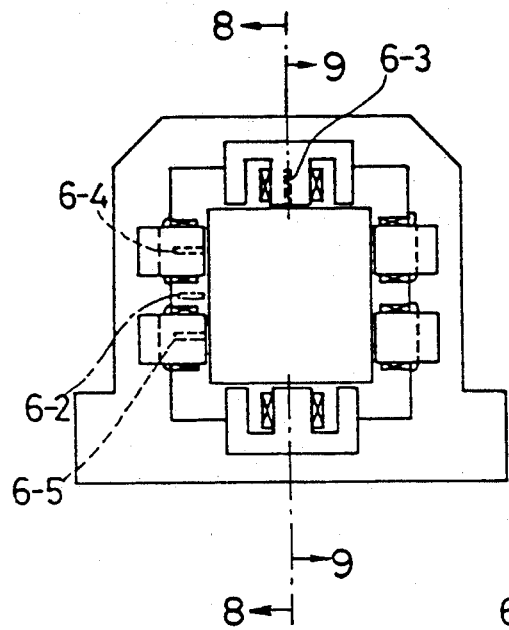
FIGS. 7, 8 and 9 are the section views of major portions for showing the layout of the electromagnetic poles in the same embodiment.
Figure 8:
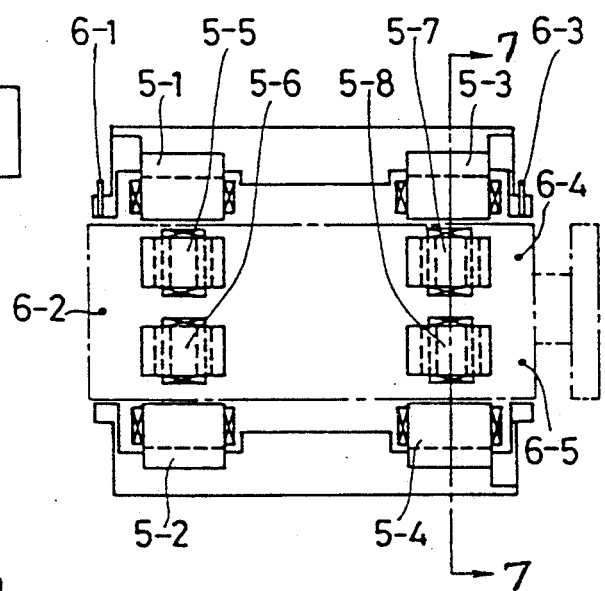
Figure 9:
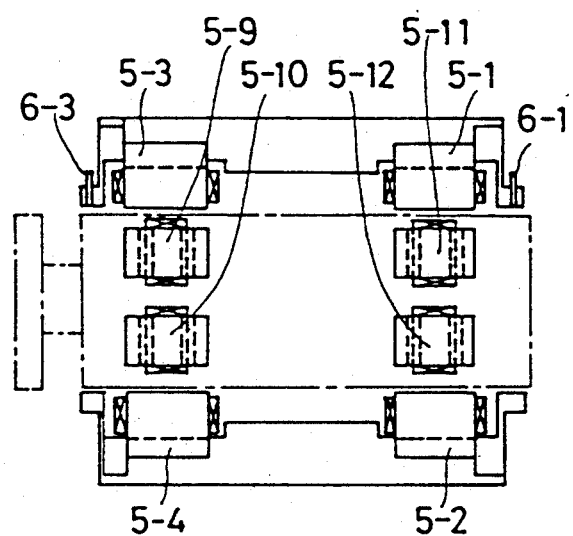

Now referring to FIGS. 1 and 2, a rotating shaft 1 is supported by a bearing 2 arranged in 2 positions in the axial direction. The bearing 2 is fixed on the bearing holding body 3 of a magnetic material. The bearing holding body 3 is supported radially with a leaf spring 4 arranged at 2 positions, apart in an axial direction. The leaf spring is a W-shaped body as shown in FIG. 3. The leaf spring 4 is fixed onto an outer housing 8 by means of a leaf spring clamp (I) 41 and connected to the bearing holding body 3 by means of a leaf spring clamp (II) 42. The leaf spring 4 deforms as shown in FIGS. 4 and 5 according to a direction of loading the bearing holding body 3. An electromagnetic pole 5 is structured, as shown in FIG. 6, with silicone steel sheets shaped in E form and stacked, while winding a coil at the center part. A sensor 6 detects a position of the bearing holding body 3. Electromagnetic poles 5 and sensors 6 are arranged as shown in FIGS. 7 through 9. A total of 12 electromagnetic poles are provided symmetrically; 4 pieces in the vertical direction and 8 pieces in the horizontal direction. FIG. 8 shows a layout view of electromagnetic poles 5 and sensors 6 viewed from the line 8—8 direction of FIG. 7. FIG. 9 shows the same layout view seen in the line 9—9 direction of FIG. 7. FIG. 7 provides a side section view seen from the line 7—7 of FIG. 8.

Referring to the drawings, the electromagnetic poles are mounted radially outwardly of the leaf springs 4 in opposition to each other in vertical and horizontal directions, while being fixed onto the outer housing 8. There are pairs of electromagnetic poles (5-1, 5-2) and (5-3, 5-4) in the vertical direction, also with pairs of the same (5-5, 5-11), (5-6, 5-12), (5-7, 5-9) and (5-8, 5-10) in the horizontal direction. Sensors 6 include those 6-1, 6-3 in the vertical direction and the same 6-2, 6-4 and 6-5 in the horizontal direction. With sensors 6-1 and 6-3, the displacement and inclination of the bearing holding body 3 in the vertical direction are detectable. Sensors 6-2, 6-4 and 6-5 detect the displacement, inclination and torsion (rotation) of the bearing holding body 3 in the horizontal direction.

When a load is applied to the rotating shaft 1 in the vertical direction, the bearing holding body 3 supported by the leaf springs 4 via the bearings 2 is stressed to move in the loading direction. Sensors 6-1, 6-3 detect its displacement quantity while supplying currents to pairs of electromagnetic poles 5-1, 5-2 and 5-3, 5-4 through a control circuit not illustrated, thus positioning the rotating shaft 1 to a target position in the vertical direction.

When a load acts on the rotating shaft 1 in the horizontal direction, sensors 6-2, 6-4, 6-5 detects its displacement quantity while supplying currents to pairs of electromagnetic poles 5-5, 5-11, the same 5-6, 5-12, the same 5-7, 5-9 and the same 5-8, 5-10 are operated to position the shaft to a target position in the horizontal direction.

When the rotating shaft 1 rotates, a torque is activated to rotate the bearing holding body 3 in the rotating direction, via the bearing 2. The leaf spring of FIG. 3 does not generate withstanding force against this torque. However, the bearing holding body 3 is prevented from being rotated by the operation of electromagnetic pole pairs 5-5, 5-11, pairs 5-6, 5-12, pairs 5-7, 5-9 and 5-8, 5-10, as arranged on the outer surface of the bearing holding body 3 in opposition to each other.

It is of course true that, instead of the leaf springs, any of torsion bar springs, rubber air springs and other elastic bodies are also operable.

According to the construction described above, the state of operating and vibrating the bearing can be positively controlled according to the characteristics of a control circuit.

Figure 12:
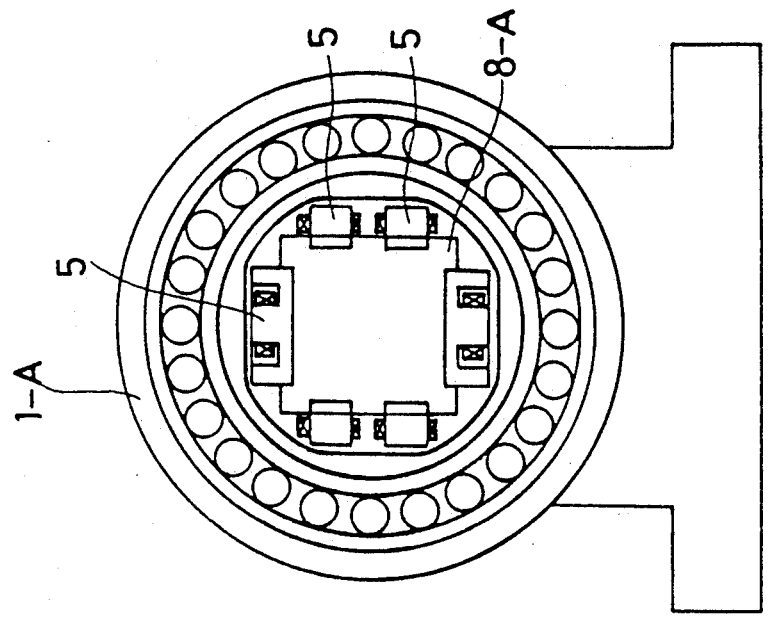
FIG. 12 denotes a side section view of the same portions.
Figure 11:
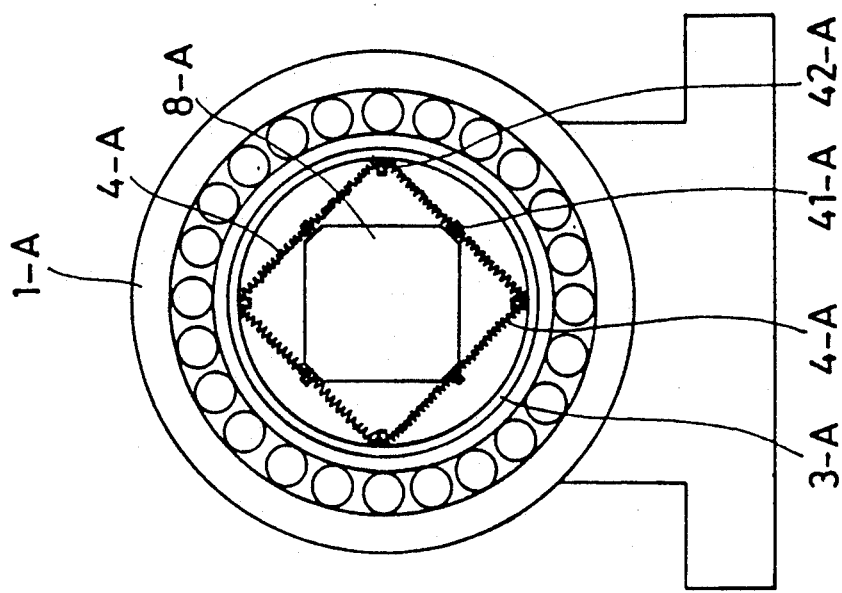
FIG. 11 illustrates a side view of the same major portions.

FIGS. 10 through 12 shows major portions of a second embodiment "magnetically controlled bearing unit" of the present invention; FIG. 10 is a side cross section view of the embodiment; FIG. 11 is a side view seen from the line 11—11 of FIG. 10 and FIG. 12 is a side section view seen from the line 12—12 of FIG. 10.

Figure 13:
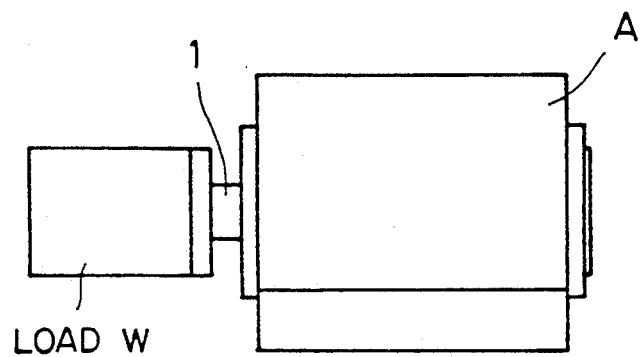
FIGS. 13 and 14 are side views for showing application examples of the first and second embodiments.
Figure 14:
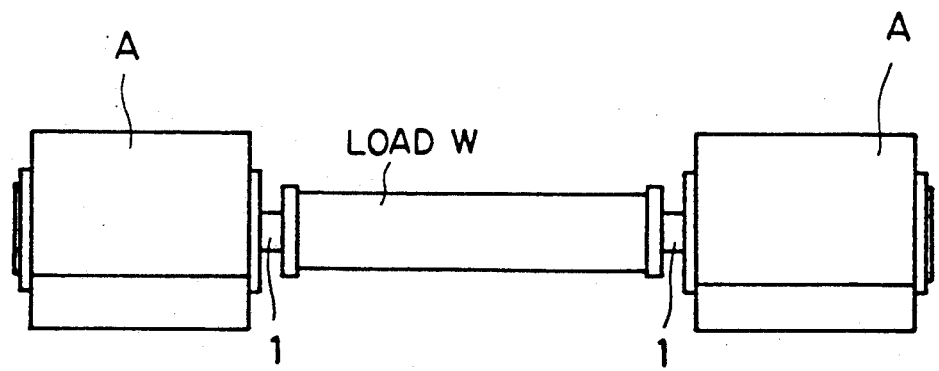

A roller 1-A is supported by bearings 2-A while bearings 2-A being fixed the a bearing holding body 3-A. The bearing holding body 3-A is supported radially by springs 4-A. In the axial direction, the bearing holding body 3-A is positioned by engaging an axial positioning pin with an axial positioning groove equipped on an inner housing 8-A, with a gap. Springs 4-A are fixed on the inner housing 8-A by spring setting means (I) 41-A and connected to the bearing holding body 3-A by spring setting means (II) 42-A. The structure, layout, sensor positions and functions of the second embodiment are the same as those of the first embodiment except that the electromagnetic poles are mounted on the inner housing 8-A while they are mounted on the outer housing 8 in the first embodiment. The magnetically controlled bearing unit A, used in the first or second embodiment, is operated in a cantilever system shown in FIG. 13 or dual-end support system shown in FIG. 14, in relation to an operating load W.

The embodiments of the control circuit in each embodiment described above are explained in the following.

Figure 15:
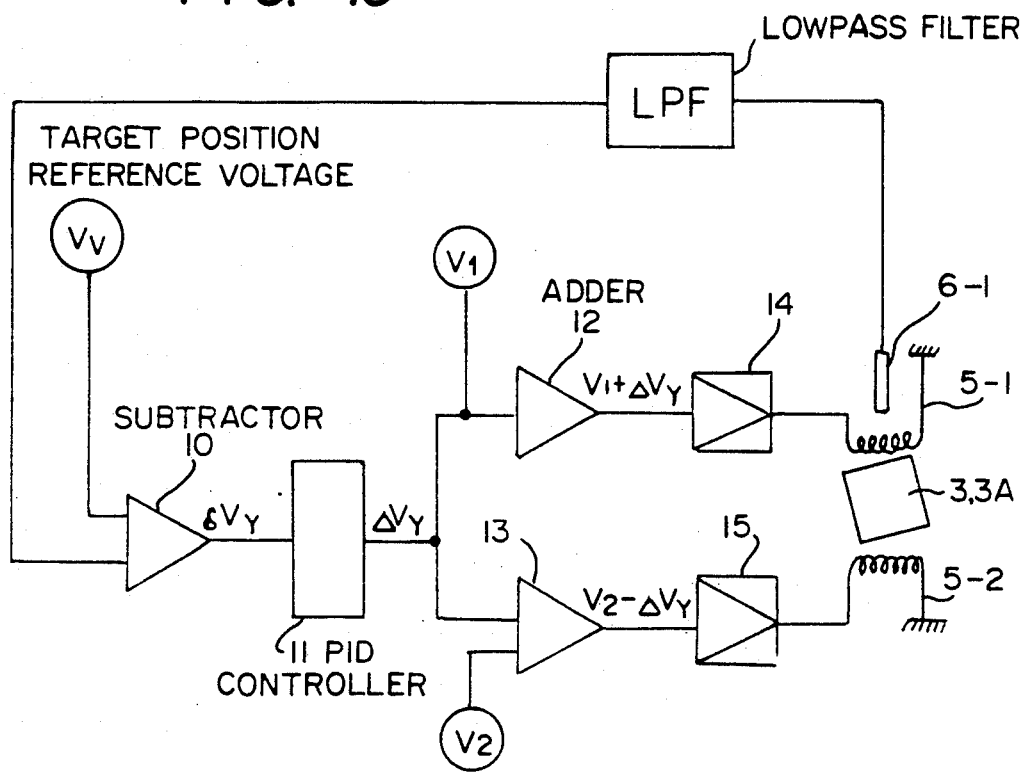
FIG. 15 is a block diagram of the control circuit in the first and second embodiments.
Figure 16:
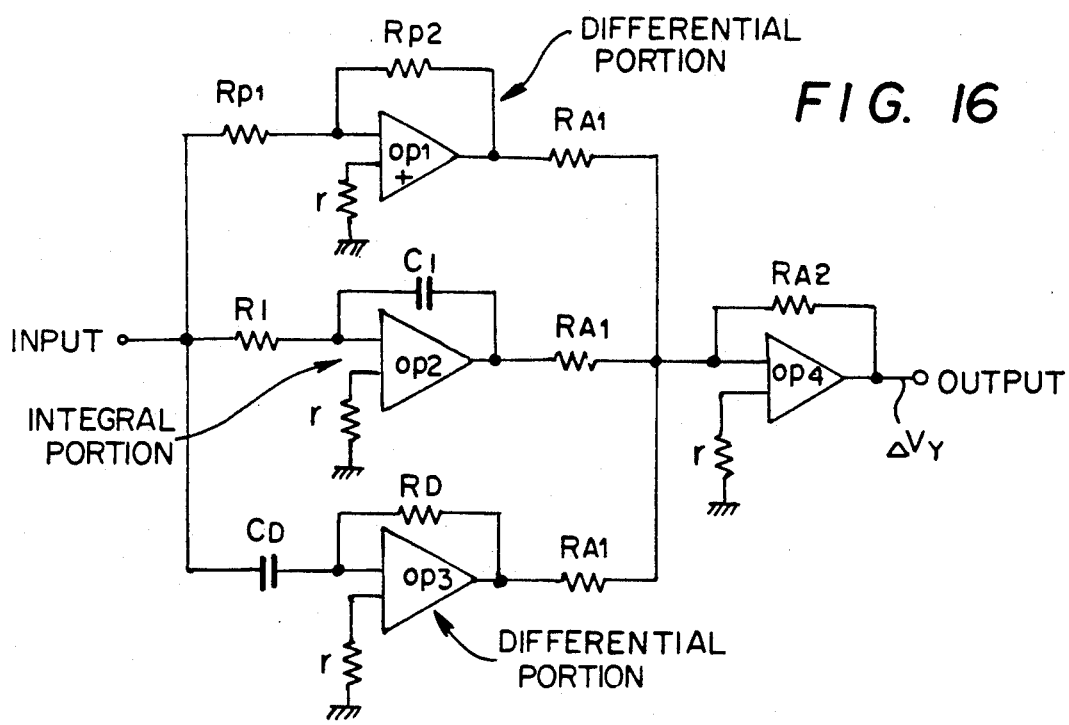
FIG. 16 is a circuit diagram for a PID controller in the same control circuit.

FIGS. 15 and 16 show major portions of a control circuit according to the first or second embodiment "magnetically controlled bearing unit" of the present invention; FIG. 15 is a block diagram for showing the entire control circuit; FIG. 16 shows a circuit diagram of a PID controller in FIG. 15.

In these figures, numerals 5-1 and 5-2 shows a pair of electromagnetic poles in the same number in the first embodiment, while numeral 6-1 showing the sensor of the same number in the same embodiment.

The conditions of a displacement with a moving body (in this case, a bearing holding body 3 in the case of the FIG. 1 embodiment or bearing holding body 31A in the case of the FIG. 10 embodiments are detected by sensors 6-1 of which the output signals are sent to a subtractor 10 through a lowpass filter LPF for filtrating noise. Another input to the subtractor 10 is a target position reference voltage $V_0$ (in the case. $V_V$) for showing a target position of the holding body 3 in the vertical direction. An output of said subtractor 10 is transmitted to a PID controller 11. The output from the PID controller 11 is separated into 2 parts; one is added to a bias voltage $V_1$ in an adder 12 while the other is compared with a bias voltage $V_2$ in a subtractor 13 while both parts of the output being sent to power amplifiers 14, 15, respectively and then to the coils of electromagnetic poles 5-1, 5-2. The holding body is controlled until the output of the subtractor 10 becomes 0, that is, the holding body occupies a reference position. Now bias voltages $V_1$ and $V_2$ are described. According to the difference between $V_1$ and $V_2$, a difference of currents flowing in the coils of the electromagnetic poles 5-1, 5-2 is generated and creates a difference of the attracting forces of the electromagnetic poles 5-1, 5-2. In this case, circuit parameters are selected so that the difference of attracting forces corresponds to the self gravity of the holding body 3.

In the control circuit of this embodiment, there is a differential circuit element, for leading a phase for applying damping force to the movement of the holding body, in the D portion of the PID controller.

An example of the PID (proportional plus integral plus differential information processing) controller shown in FIG. 15 is described in FIG. 16.

Referring to FIG. 16, a proportional portion (portion P) is composed of $R_{P1}$, $R_{P2}$, r, and OP1, while constituting an integral portion (portion I) by $R_I$, $C_I$, r, OP2, a differential portion (portion D) by $C_D$, $R_D$, r and OP3. In the $R_{A1}$, $R_{A2}$, r and OP4, Portions P, I and D are added thus providing a PID controlled output to the input. For other pairs of the electromagnetic poles, the same composition also applies.

When the changing of a damping force or a spring constant related to the movement of the holding body is required according to the mass of the holding body or the revolution frequency of the shaft, some or all circuit constants ($V_1$, $V_2$, $R_{p1}$, $R_{p2}$, $R_I$, $C_I$, $C_D$, $R_D$, $R_{A1}$, $R_{A2}$), etc. in the control circuits of FIGS. 15 and 16 are changed manually or automatically. Thereby, the frequency characteristics (vibration characteristics) of a dynamic stiffness for movement of the holding body are changed.

Figure 17:
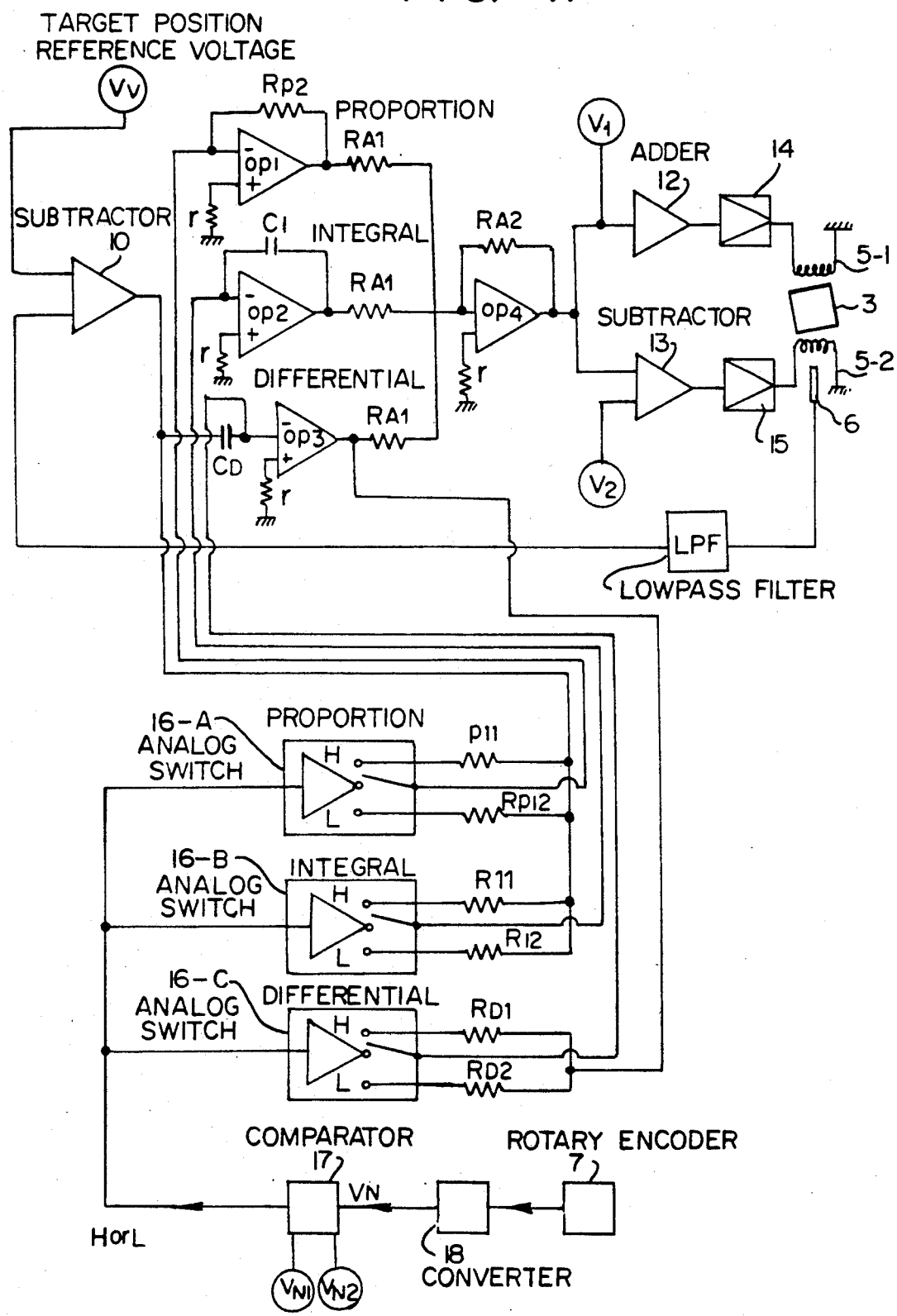
FIG. 17 shows a block diagram of the control circuit in the third and fourth embodiments.
Figure 18:
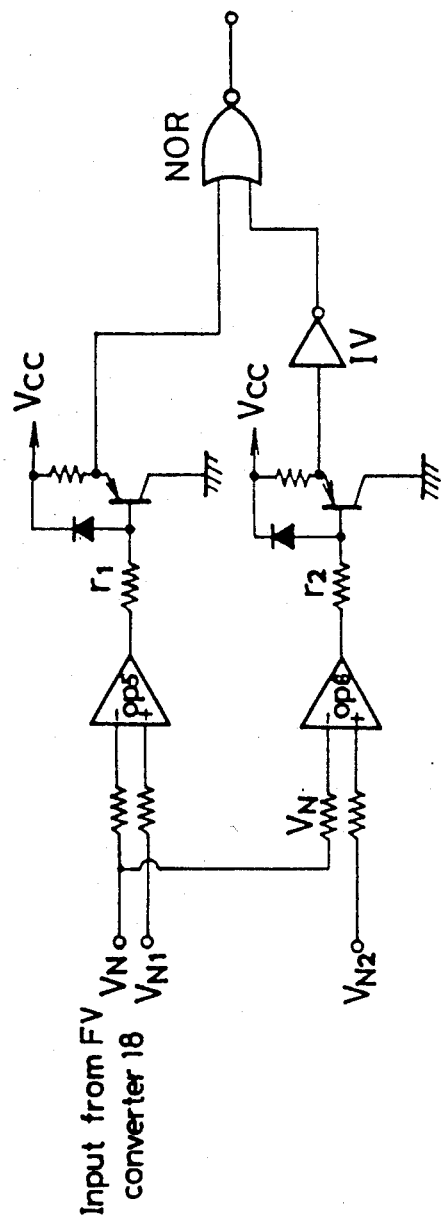
FIG. 18 is a circuit diagram of a comparator in the same control circuit.
Figure 19:
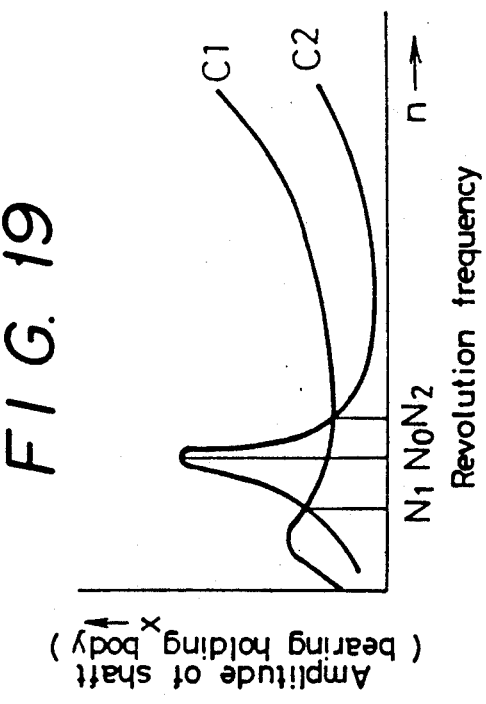
FIG. 19 is a depiction of the for the shaft amplitude versus revolution frequency characteristics of the third and fourth embodiments.

Such an example as above is described in relation to the third and fourth embodiments of the present invention, referring to FIGS. 17 through 19. FIG. 17 is a block diagram for major portions of the same embodiments, while FIG. 18 showing a circuit diagram of a comparator 17 in FIG. 17 and FIG. 19 illustrating revolution frequency/amplitude characteristic view of the same embodiments.

The frequency characteristics of the moving body, namely the bearing holding body 3 become as shown in FIG. 19. The gain of the control system is determined by the method of designing circuit constants in the control circuit. With a small gain, the amplitude characteristics of the bearing holding body in terms of revolution frequency become $C_1$. With a large gain, curve $C_2$ results.

Curves $C_1$ and $C_2$ show vibration characteristics of the shaft or shaft holding body when constants of the control system or spring constants of the bearing are changed.

Unless circuit constants are changed, amplitude characteristics become typically similar to Curve $C_1$ or $C_2$. With a curve like Curve $C_1$ effected, the amplitude at high revolution frequency becomes larger despite a small amplitude at a critical frequency. On the other hand, when the characteristics are similar to Curve $C_2$, the amplitude becomes large at a critical frequency although it becomes smaller in high revolution frequencies. In both cases, a larger amplitude brings about large vibration of a base.

However, amplitudes over the entire range of revolution frequencies are effectively suppressed by varying the circuit constants in such a manner that Curve $C_2$ is effected under a revolution frequency of $N_1$ and over $N_2$ while selecting the Circuit constants to effect Curve $C_1$ in the range of $N_1$ to $N_2$ revolution frequencies. In particular, such a resonance state as shown at a critical revolution frequency of $N_0$ can be avoided.

This operation is realized by a control circuit shown in FIG. 17; a revolution frequency of n is detected by a rotary encoder 7 attached to the rotating shaft 1 of FIG. 1 and converted to an analog voltage output Vn in the FV converter 18 in which the output Vn is compared with outputs $V_{N1}$, $V_{N2}$ of the FV converter corresponding to revolution frequencies $N_1$, $N_2$ ($N_1 < N_D < N_2$) near a critical revolution frequency $N_0$. Thus, when the revolution frequency n is close to the critical revolution frequency of Curve $C_2$, namely $V_{N1} < V_N < V_{N2}$, analog switches 16-A, 16-B and 16-C are changed over from the conditions where the revolution frequency is far from the critical frequency, namely $V_N < V_{N1}$ or $V_N < V_{N2}$, thus the circuit constants of the PID controller are changed.

A comparator 17 is composed as shown in FIG. 18.

An input $V_N$ from the FV converter is compared with $V_{N1}$ and $V_{N2}$ in operating amplifiers OP5 and OP6, passes resistances $r_1$ and $r_2$, an interface comprising a diode and a transistor and an inverter and a NOR element. When $V_{N1} < V_N < V_{N2}$, a high-level signal is output Low-level signals are output on conditions other than the above. Correspondingly, analog switches 16-A, 16-B and 16-C are changed over H or L while changing circuit constants. Thus, the characteristics of Curve $C_2$ are available where the revolution frequency of the shaft n is less than $N_1$ or more than $N_2$. The characteristics of Curve $C_1$ are available when the revolution frequency n is in between $N_1$ and $N_2$.

The diode of FIG. 18 is provided for changing levels when the voltage of power supplied to the operation amplifier is 15 V while the same to the transistor being 5 V.

Figure 20:
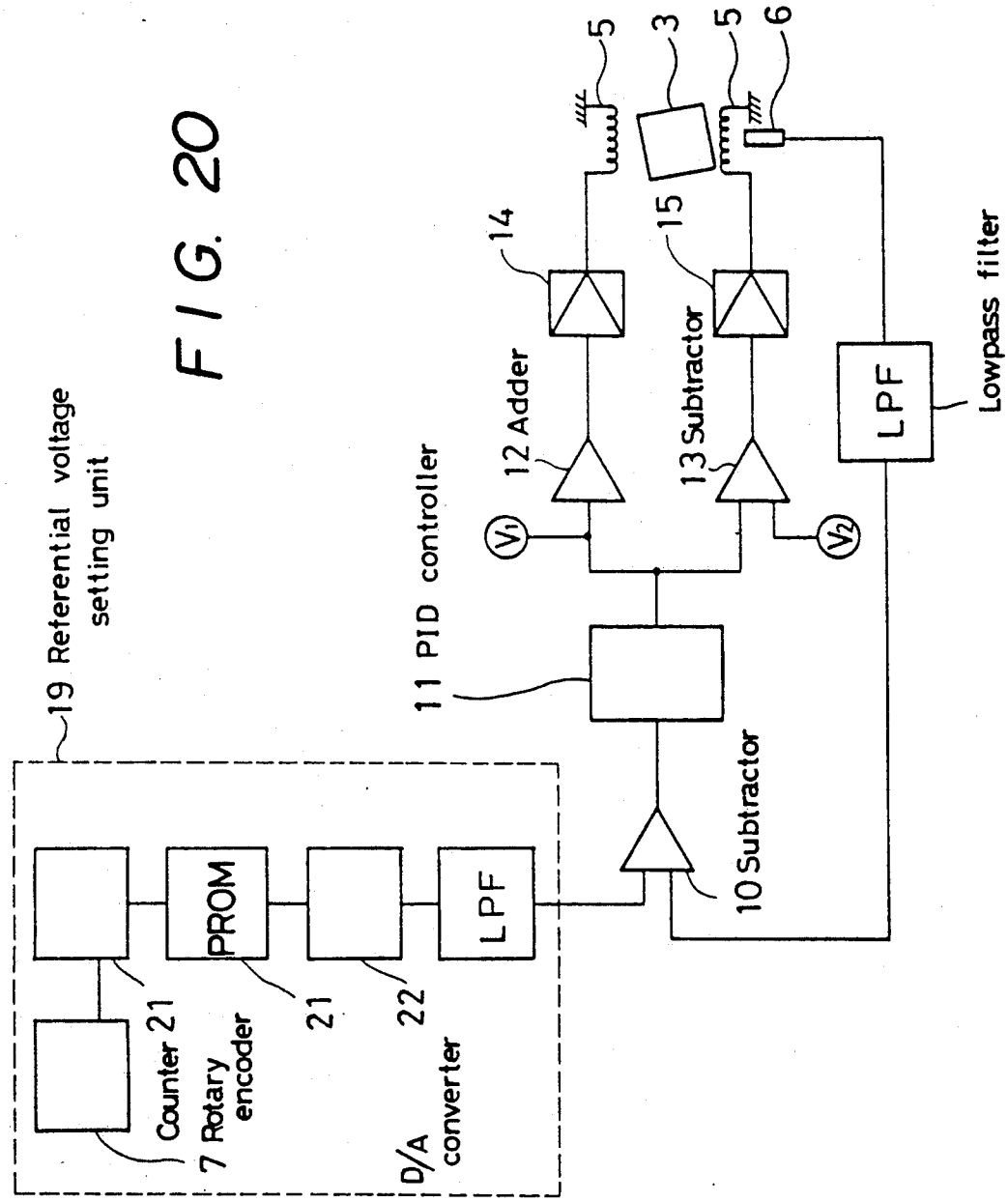
FIG. 20 is a block diagram of the control circuit in the fifth embodiment.

FIG. 20 is a block diagram showing major portions of a fifth embodiment of the present invention.

An object of this embodiment is that the surface of a rotating body varies in a predetermined manner in synchronization of the revolution of the rotating body by means of a reference voltage setting. circuit unit 19 which is a means for changing a target position reference voltage to be applied to each electromagnetic pole for the bearing holding body periodically according to the revolution angle of the rotating body namely a rotating shaft 1 or a roller 1-A. Referring to FIG. 20, an output signal of a revolution angle for the rotating body is taken out by a rotary encoder 7 shown in FIG. 1 and sent to a counter. The output signal of the counter enters the address of PROM 21. In the PROM 21, a data (table) for the target shaft center coordinates to each revolution angle of the shaft is stored beforehand. The output of the PROM21 is entered in a D/A converter 22 of which the output is passed in a lowpass filter thus converting to a target position reference voltage $V_V$ corresponding to a target position data of the shaft. This type of the control system allows to control the shaft center of the bearing unit within a predetermined runout. Therefore, this system is applicable to the main spindle of a lathe which is suitable for cutting a product in shaped section as well as round section.

Figure 21:
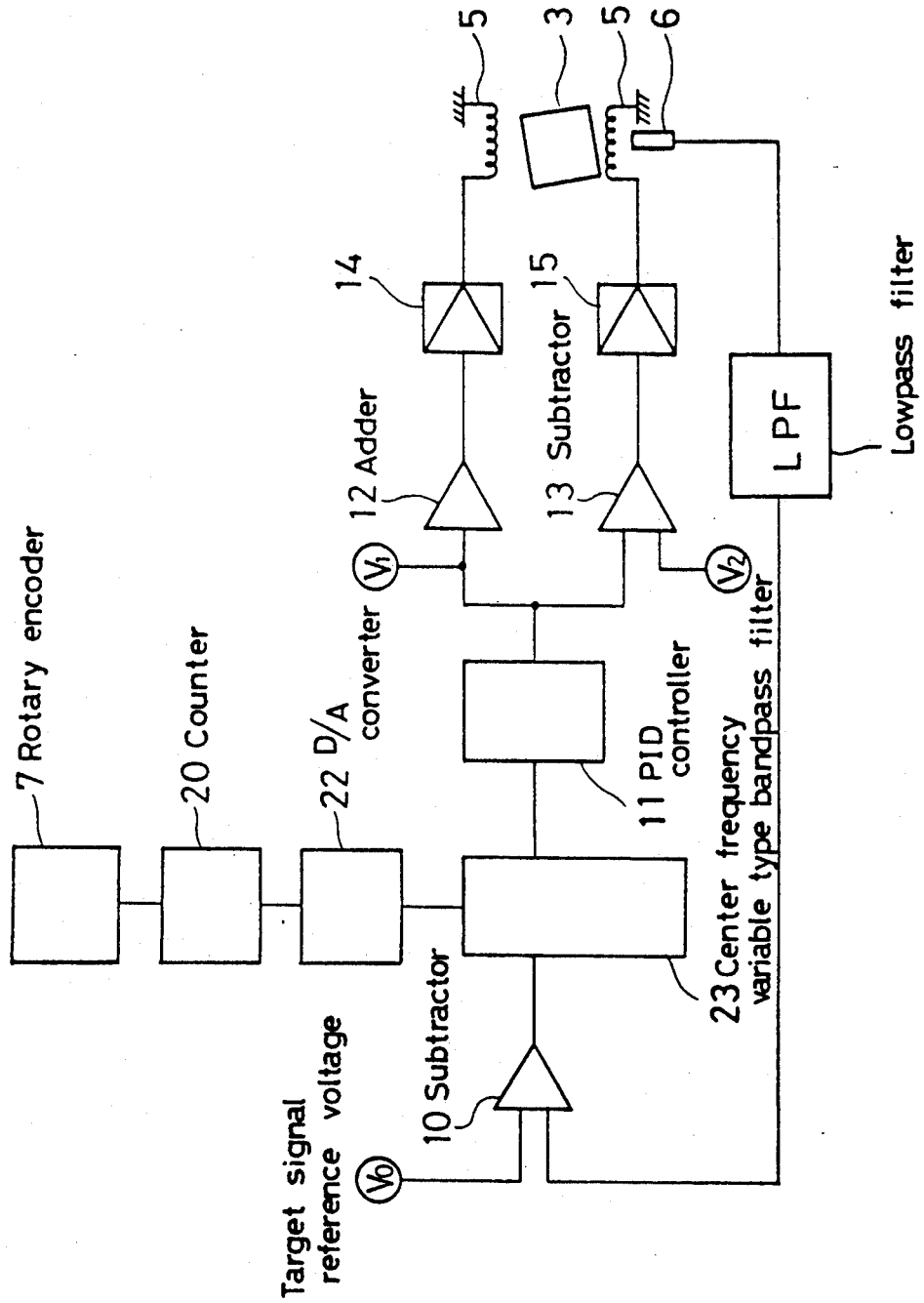
FIG. 21 is a block diagram for the control circuit in the sixth embodiment.

FIG. 21 is a block diagram which shows major portions of a sixth embodiment of the present invention.

This embodiment is operated in such a manner that a rotating shaft 1 is revolved around the principal axis of inertia by blocking the feedback of frequency components corresponding to revolution frequencies in order for preventing to transmit shaft vibration to the outside, e.g. a housing. Referring to FIG. 21, the revolution frequency of the rotating shaft 1 is detected by means of a rotary encoder 7 and entered in a center frequency variable type bandpass filter 23 through a counter 20 and a D/A converter 22. Thus, corresponding to a revolution frequency, the output of a subtractor 10, entering in the center frequency variable type bandpass filter 23, is removed. Thereby, the frequency component feedback control corresponding to the revolution frequency of the shaft is no longer activated. Therefore, a moving body (bearing holding body 3) does not exert any restrictive force to the revolution of the rotating shaft 1, once it begins to rotate. Consequently, the rotating shaft 1 rotates around the principal axis of inertia according to own imbalance. At that time, vibration due to imbalance of the rotating shaft 1 is no longer transmitted to the outer housing because no fluctuating components of electromagnetic attracting force for the electromagnetic poles are generated.

Figure 22:
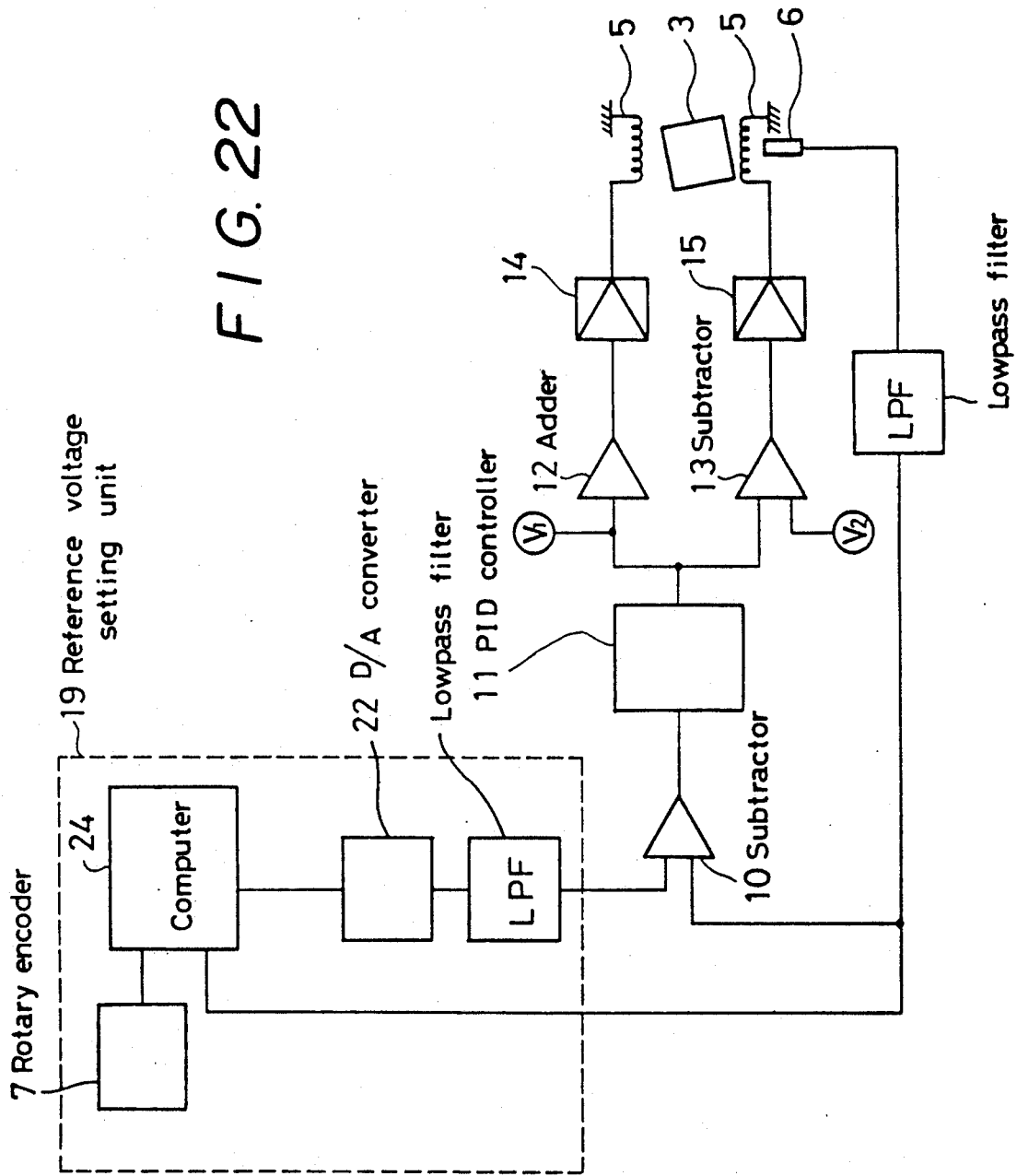
FIG. 22 is a block diagram of the control circuit in the seventh embodiment.

FIG. 22 is a block diagram showing major portions of a seventh embodiment of the present invention.

According to this embodiment, a computer calculates an imbalance position and an imbalance quantity for moving a bearing holding zone intentionally by electromagnetic poles thus rotating the shaft around the principal axis of inertia.

Referring to FIG. 22, the computer 24 receives information on revolution and displacement transmitted from a rotary encoder 7 and a sensor 6, respectively. The computer 24 calculates an imbalance quantity of the rotating shaft at an imbalance position while also calculating a deviation between the principal axis of inertia and the principal axis of rotation at the position of the bearing holding body 3. More explicitly, referring to FIG. 21, for example in which the shaft is revolving around the principal axis of inertia (i.e. no feedback is effected), the computer stores displacement information on the bearing holding body 3 in relation to the revolution angle information of the shaft, namely coordinate information of the principal axis of inertia per shaft revolution. Thus, the computer 24 also calculates and stores displacement information of the bearing holding body 3 in relation to the revolving angle information of the principal axis around which the shaft is rotating at present, namely the difference from the coordinate information in relation to the principal axis of rotation. Next, the computer 24 periodically outputs target position reference voltages to each electromagnetic poles so that the difference between said 2 coordinate information is eradicated, in such a manner as periodically changing. There is also another method for obtaining said coordiate information around the principal axis of inertia in which the attracting force of each electromagnetic pole is obtained from the current value of each electromagnetic pole and displacement information of the bearing holding body 3, thus a centrifugal force distribution being calculated from the attracting force for obtaining coordinate information around the principal axis of inertia. It is also possible to obtain a target reference voltage for each electromagnetic pole using said coordinates around the principal axis of inertia, so that the difference between 2 coordinate information as described above no longer exists, thereby controlling the output from the computer 24. This output from the computer is entered in a subtractor 10 via a D/A converter 22 and a lowpass filter, as a target position reference voltage. Thus, the bearing holding body 3 can be rotated with its revolving axis held around the principal axis of inertia while maintaining a damping force and a spring force. In consequence, vibration due to inbalance in the rotating shaft is not transmitted to the outer housing.

Figure 23:
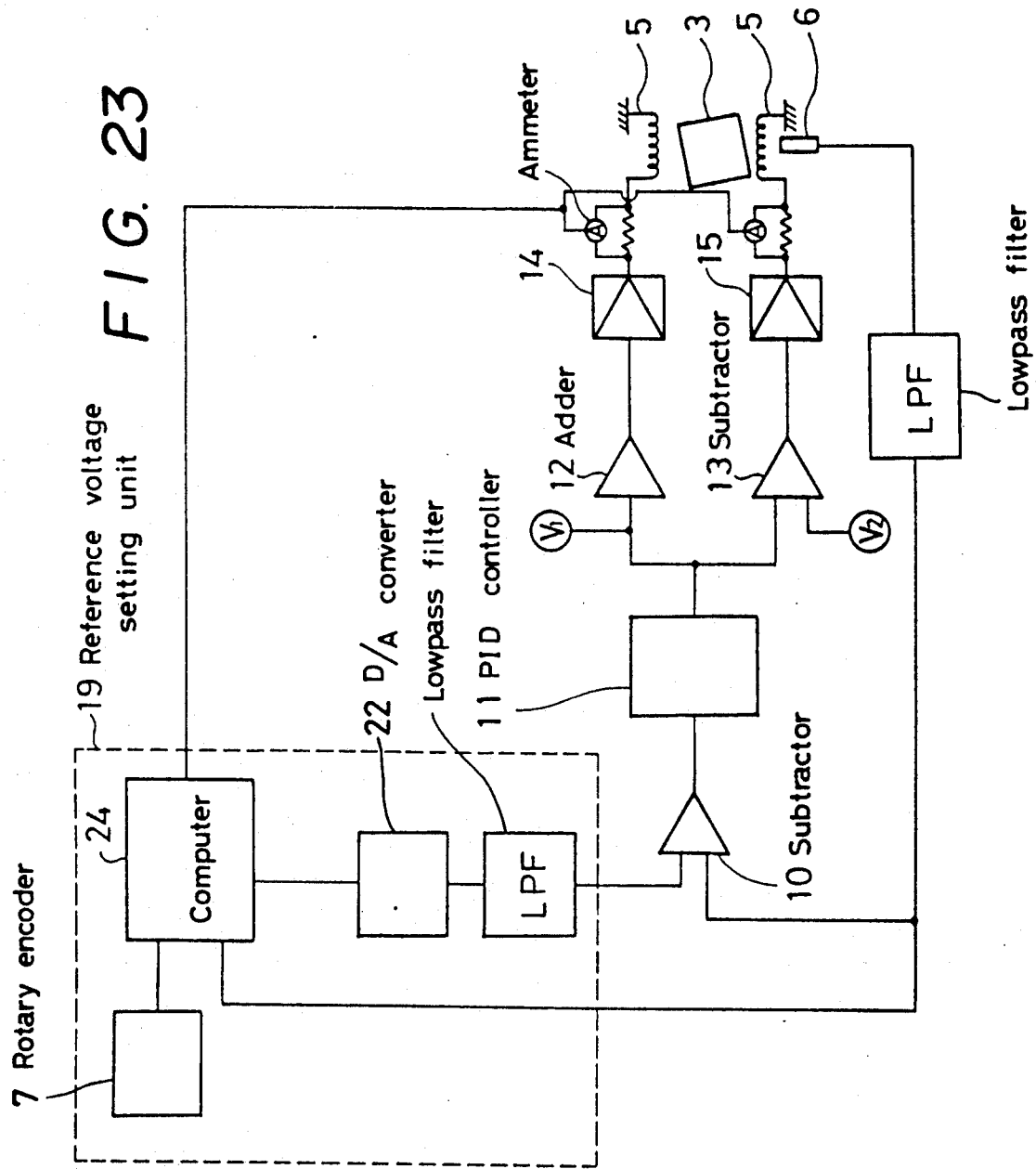
FIG. 23 is a block diagram of the control circuit in the eighth embodiment.

FIG. 23 is a block diagram showing major portions of an eighth embodiment of the present invention.

According to this embodiment, the target position reference voltage with control circuit shown in FIG. 22 is further modified by detecting a current flowing in the coil of each electromagnetic pole in the control circuit of FIG. 22, entered in the computer 24 and adjusting so that the sum of effective correcting currents for the run-out of the bearing holding body is minimized among currents flowing in the coils of electromagnetic poles.

In the control circuit of FIG. 23, another means for modifying further the target position reference voltage of each electromagnetic pole can also be provided to minimize the vibration acceleration of the outer housing 8 or inner housing 8-A by detecting the vibration acceleration, instead of detecting currents supplied to the electromagnetic poles.

Figure 24:
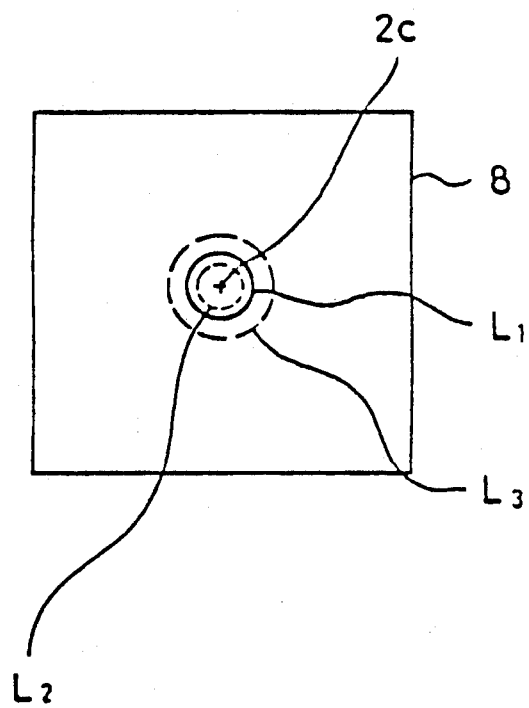
FIG. 24 gives a locus view of the bearing center.
Figure 25:
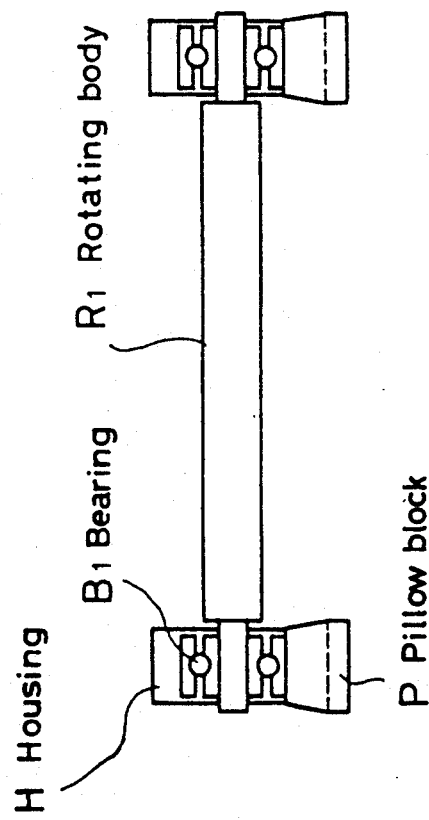
FIG. 25 is a general view of a conventional example.
Figure 26:
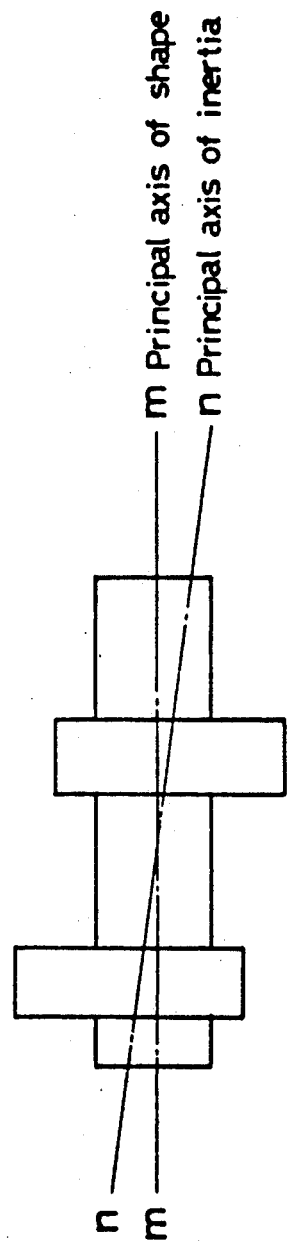
FIG. 26 shows as description between the principal axes of shape and inertia.
Figure 27:
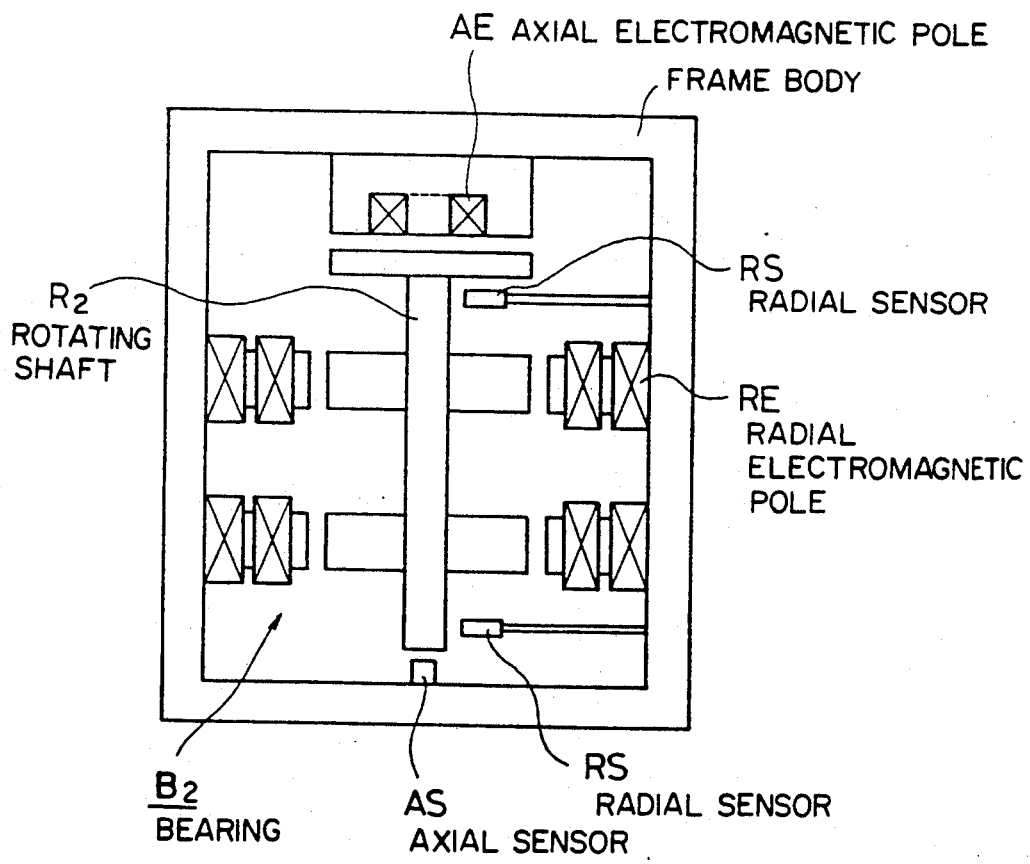
FIG. 27 illustrates a general view of another conventional example.

Now, the control operation of each embodiment as shown in FIGS. 22 and 23 is explained while referring to the locus of a bearing center 2c of FIG. 24.

An object of the present invention is that a vibration force, created due to inbalance when a rotating shaft in inbalance revolves, is not transmitted to the housing 8. For this purpose, the rotating shaft is allowed to freely revolve around the principal axis of inertia. In fact, the bearing holding body 3 integrated with the bearing 2 is moved to match the movement of the rotating shaft 1 in the bearing unit, when the shaft revolves around the principal axis of inertia. This object would be achieved by supporting the bearing holding body 3 with extremely soft springs in a state similar to free supporting. However, no satisfactory static stiffness could be obtained at that time but the rotating shaft 1 would be greatly displaced once a force (e.g. gravity) applies. Consequently, the embodiments of FIGS. 22 and 23 have been accomplished for realizing the satisfactory movement of the holding body 3 as described before while maintaining complete static stiffness and satisfactory damping force.

Referring to FIG. 24, a solid line $L_1$ shows the locus of a bearing center 2c with the bearing holding body 3 supported freely. A chain line $L_2$ relates to a case where the free movement of the bearing holding body 3 is suppressed, while a broken line $L_3$ showing a case of excess run-out. When a run-out correcting current is applied to each electromagnetic pole, the case in the solid line, provides a minimum electromagnetic energy supplied, compared to the cases of the chain and broken lines.

The control circuit of FIG. 22 is provided so that the movement of the bearing center matches the locus of the solid line in FIG. 24 by applying a bearing holding body run-out correcting current to each electromagnetic pole after calculating a target position reference voltage with the computer 24.

The control circuit of FIG. 23 modifies the correction current for more complete coincidence if the movement of the bearing center does not agree completely with the solid line of FIG. 24 with the control circuit of FIG. 22, because of phase delay, etc.

In place of the current detection in FIG. 23 as described above, it is also possible to detect the vibration acceleration of the bearing holding body 3 for controlling.

The embodiments of the control circuits have been explained with a composition according to the first embodiment. However, this is only for the convenience of explanation. Each embodiment of the control circuit can also be explained with the construction according to the second embodiment of the present invention.

In describing the embodiments of the control circuits, the electromagnetic poles are assumed in 2 pairs. It is also possible needless to say that a plurality of electromagnetic pole sets, constituting the pairs in the first and second embodiments of the present invention, is also controlled.

As described above, the present invention provides a vibration system most suitable for application and operation conditions, etc. by freely setting a damping force and a spring constant in the vibration system comprising a rotating shaft, a roller bearing and a housing.

In addition, the present invention also brings about an advantage that a smaller current is required for the control because only a fluctuating component of the current, in excess of a spring system supporting load, is to be controlled, since a spring or a similar material in effect is used.

Further, the center of a rotating shaft or the surface of a rotating body can be varied according to a revolution angle. Therefore, an embodiment of the present invention is applicable, for example, a cutting work of a product in shaped section.

Moreover, a rotating shaft or a roller is rotatable around the principal axis of inertia according to the present invention. Consequently, a vibrating force due to inbalance in a rotating body provided with the rotating shaft or the roller is not transmitted to a housing, a pillow block, etc.

We claim:

1. A magnetically controlled bearing unit comprising a rotating member, a bearing for supporting said rotating member, a bearing holding body for holding said bearing, an outer housing which holds said bearing holder body by supporting with an elastic body, a plurality of electromagnetic poles which are arranged in opposition on an outer wall of said bearing holding body with intervals therebetween and are fixed on said outer housing, a plurality of sensors which are mounted on one of said outer housing and said bearing holding body, and a control circuit which controls the intensity of an attracting force of said electromagnetic poles according to a detecting output of said sensors.

2. A magnetically controlled bearing unit comprising a rotating member, a bearing for supporting said rotating member, a bearing holding body engaged in an inner ring of said bearing and holding the bearing, an inner housing which holds said bearing holding body by supporting with an elastic body, a plurality of electro-magnetic poles which are arranged in opposition on an inside wall of said bearing holding body with intervals therebetween and are fixed on said inner housing, a plurality of sensors which are mounted on one of said inner housing and said bearing holding body and detect the movement of the bearing holding body and a control circuit which controls the intensity of an attracting force of said electromagnetic poles according to a detecting output of said sensors.

3. The magnetically controlled bearing unit according to claim 1 or 2, wherein the control circuit has a variable circuit constant and is capable for giving variable damping force and spring constant to the bearing holding body.

4. The magnetically controlled bearing unit according to claim 1 or 2, wherein the control circuit is provided with a means for changing a circuit constant according to a predetermined range of the revolution frequency for the rotating member.

5. The magnetically controlled bearing unit according to claim 1 or 2, wherein the control circuit is provided with a means for changing a target position reference voltage of each electromagnetic pole according to a rotating angle of the rotating member.

6. The magnetically controlled bearing unit according to claim 1 or 2, wherein the control circuit is provided with a center frequency variable band cutoff filter which cuts off a feedback of a frequency component corresponding to a revolution frequency of the rotating member.

7. The magnetically controlled bearing unit according to claim 1 or 2, wherein the control circuit is provided with a first means for calculating a deviation from a principal axis of inertia on the basis of information on a rotating angle of the rotating member and displacement information from a sensor, and a second means for varying a target position reference voltage periodically according to a revolution angle of the rotating member so that the rotating member can rotate around the principal axis of inertia.

8. The magnetically controlled bearing unit according to claim 7, comprising a third means for further modifying the target position reference voltage of each electromagnetic pole by detecting a current supplied to each electromagnetic pole, thereby minimizing a current for correcting a rotation deflection of the bearing holding body.

9. The magnetically controlled bearing unit according to claim 8, comprising a fourth means for detecting a vibration acceleration of one of the outer housing and the inner housing and a fifth means for further modifying the target position reference voltage of each electromagnetic pole for minimizing said acceleration.

* * * * *